Oct. 24, 1961　　　H. P. HARLE　　　3,005,322
AUTOMATIC ICE MAKER

Filed April 28, 1960　　　3 Sheets-Sheet 1

INVENTOR.
HAROLD P. HARLE
BY *Walter E. Hule*
HIS ATTORNEY

Oct. 24, 1961  H. P. HARLE  3,005,322
AUTOMATIC ICE MAKER
Filed April 28, 1960  3 Sheets-Sheet 2
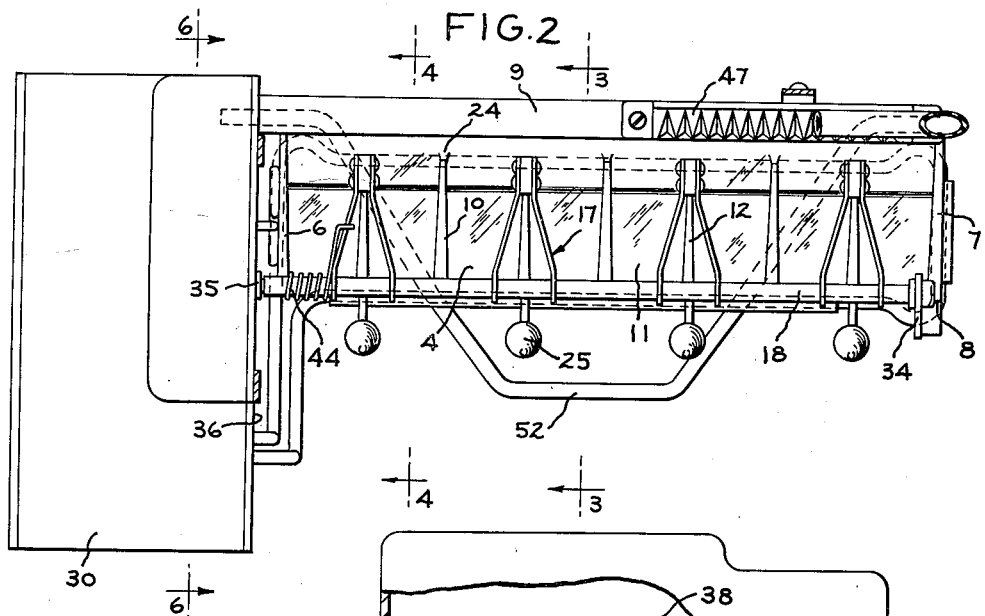
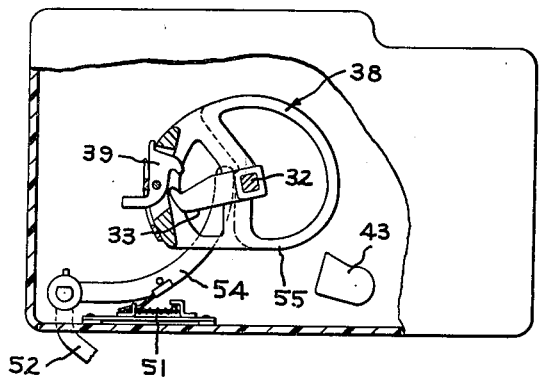
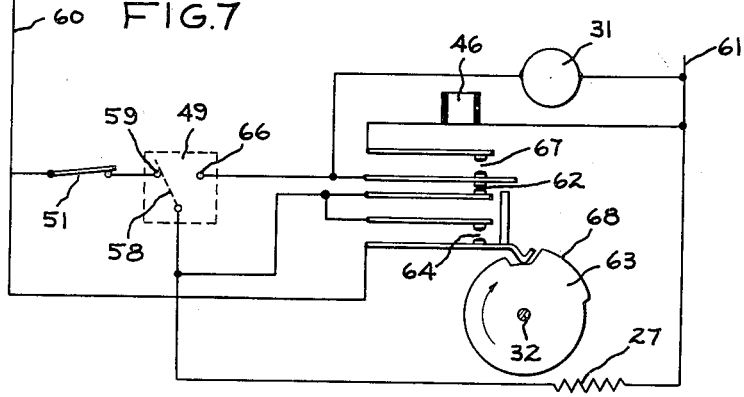
INVENTOR.
HAROLD P. HARLE
BY
HIS ATTORNEY

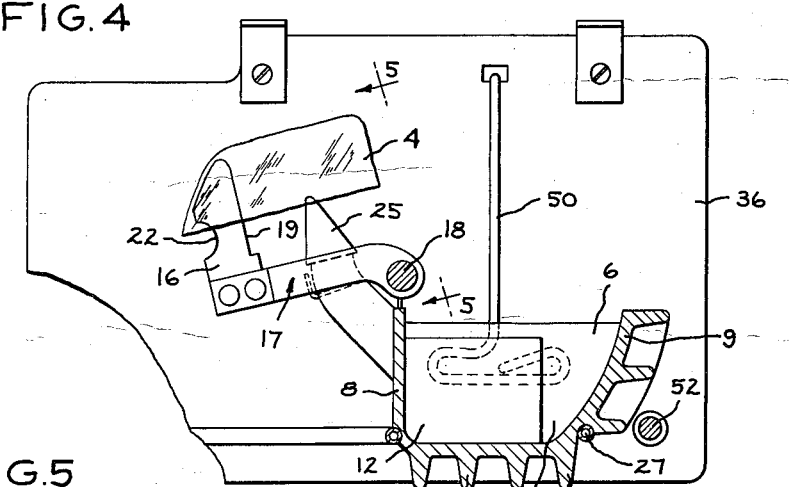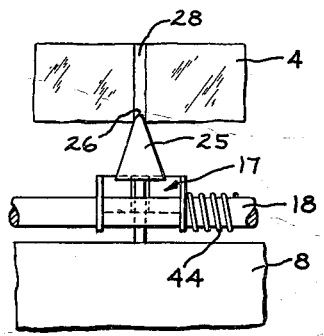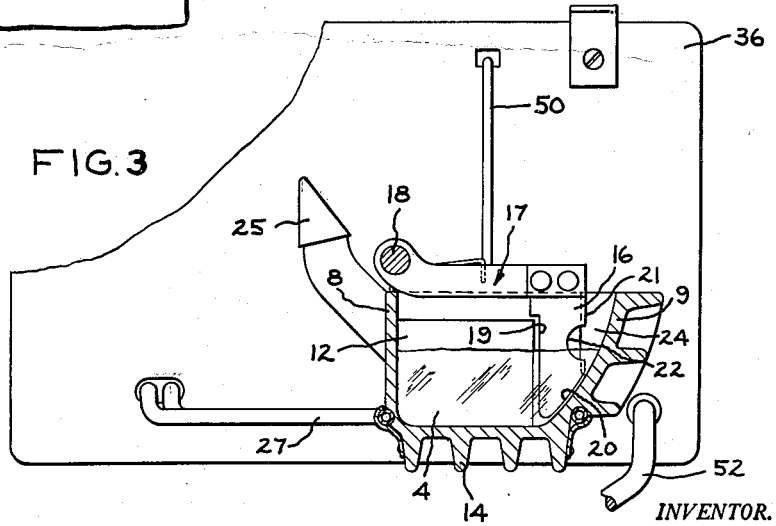

United States Patent Office 3,005,322
Patented Oct. 24, 1961

3,005,322
AUTOMATIC ICE MAKER
Harold P. Harle, Louisville, Ky., assignor to General Electric Company, a corporation of New York
Filed Apr. 28, 1960, Ser. No. 25,431
4 Claims. (Cl. 62—353)

The present invention relates to an automatic ice maker an is more particularly concerned with an ice maker adapted to be incorporated in a domestic or household refrigerator.

The invention relates particularly to the type of ice maker including a mold having a plurality of dividers or partitions dividing the mold into a plurality of sections or compartments in which a charge of water is frozen into ice pieces, and means for removing the ice pieces formed in the compartments comprising pivoting transfer elements which are frozen into engagement with the ice pieces during each freezing cycle and which are movable from their normal positions within the mold to a discharge position outside the mold.

Because of the size limitations on an automatic ice maker for a household refrigerator, it is desirable that such an ice maker have a high freezing rate and that the ice pieces be removed or harvested from the mold as quickly as possible after they have become frozen in order that the ice maker will have the required ice making capacity. The present invention has as its primary object the provision of an automatic ice maker having a high ice making capacity.

Another object of the invention is to provide an automatic ice maker including a metal pivoting transfer element which forms part of the partition or divider structure and which is designed to be frozen into engagement with the ice pieces at a point such that the ice pieces can be readily removed therefrom by mechanical means during the harvesting cycle.

A further object of the invention is to provide a novel ice maker including improved ice harvesting means designed to minimize the possibility of ice pieces removed from the mold from returning to the mold during the harvesting cycle.

Further objects and advantages of the invention will become apparent as the following description proceeds, and the features of novelty which characterize the invention will be pointed out with particularity in the claims annexed to and forming a part of this specification.

In carrying out the objects of the present invention there is provided an ice maker comprising an elongated mold having side and end walls and means including at least one transverse divider extending from one mold side wall part way across the mold so that it is spaced from the other side wall of the mold to form in the mold adjacent interconnected compartments in which water is frozen into ice pieces. For the purpose of removing ice pieces from the mold there is provided transfer means including a finger extending into the space between the partial width divider and the other mold wall where it is frozen into engagement with the ice pieces formed in the adjacent compartments. While the finger is supported out of engagement with the adjacent mold surfaces, it is preferably of a shape such that it substantially bridges the space between the partial divider and the adjacent mold side wall. After the ice pieces formed in the mold are released by warming of the mold surfaces, pivotal movement of the finger over the one mold side wall transfers the ice pieces into engagement with a bumper which contacts the ice pieces at points remote from the finger to provide a substantial leverage for removal of the pieces. Preferably the bumper has a tapered or wedge-shaped end portion adapted to enter the slot or space formed between the adjacent ice pieces by the partial divider so that it will peel or wedge the pieces free from the finger by engagement with the opposed side edges of the adjacent ice pieces.

For a beter understanding of the invention reference may be had to the accompanying drawing in which:

FIG. 2 is a plan view of the ice maker shown in FIG. 1;

FIG. 3 is a sectional view along line 3—3 of FIG. 2;

FIG. 4 is a sectional view along line 4—4 of FIG. 2 showing the ice transfer means in a discharge position;

FIG. 5 is a view along line 5—5 of FIG. 4;

FIG. 6 is a sectional view of portions of the ice maker drive mechanism taken along line 6—6 of FIG. 2; and FIG. 7 is a wiring diagram of the electrical control system employed for the automatic operation of the ice maker of the present invention.

Figure 1:
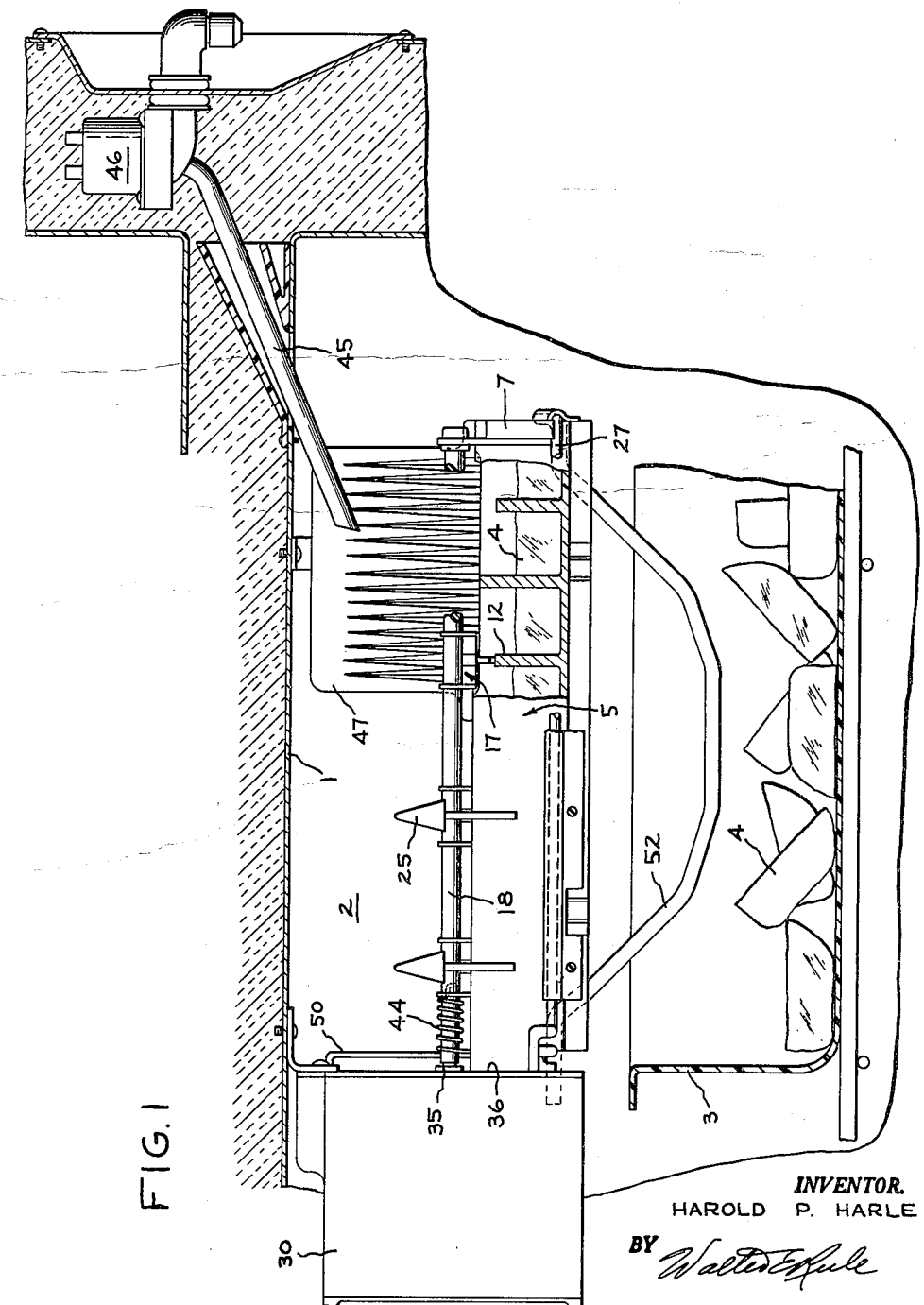
FIG. 1 is an elevational view, partly in section, of an ice maker including an embodiment of the present invention.

With reference to FIG. 1 of the drawing, there is illustrated an ice maker designed to be suspended from the top wall 1 of the low temperature or freezing compartment 2 of a household refrigerator. The contents of the compartment 2 including the ice maker are maintained at the below freezing temperatures by air circulated over a low temperature evaporator (not shown) so that the ice maker can be mounted in the compartment out of direct contact with an evaporator unit. Also positioned within the compartment and below the ice maker is an ice receptacle or bin 3 in which ice pieces 4 discharged from the ice maker are stored at below freezing temperatures.

Referring now to FIGS. 1, 2, 3 and 4 of the drawing, the ice maker includes an elongated ice mold 5 comprising end walls 6 and 7 and side walls 8 and 9 forming a substantially rectangular mold cavity which is divided into a plurality of sections by fixed, full width dividers or partitions 10 extending transversely of the mold cavity. Each of these sections is in turn divided into adjacent interconnected compartments 11 by partial dividers 12 extending from the side wall 8 a major portion of the distance across the mold and defining with the other mold wall 9 a space or passage 13 connecting the adjacent compartments. The mold proper including the end walls 6 and 7, the side walls 8 and 9, a bottom wall 14 as well as the partial dividers or partitions 12 are composed of metal and preferably comprise a unitary die cast structure. This casting may include a plurality of external fins 15 for betetr heat transfer between the cooled air circulating within the compartment 2 and the mold.

In accordance with the present invention, means for transferring the ice pieces formed in the adjacent compartments out of the mold during the harvesting cycle comprises metal fingers 16 extending into and substantially bridging or filling the spaces between the partial dividers 12 and the mold side wall 9. The fingers 16 are secured by means of frame members 17 to a shaft 18 rotatably supported above the vertical mold side wall 8. While each of the fingers 16 is spaced from the adjacent partial divider 12 and from the mold side wall 9 to prevent direct heat exchange contact therewith, each finger is preferably of a shape such that it in effect forms a continuation of the adjacent partition or divider 12. To this end, each finger is of approximately the same width as the dividers 12 and includes an inner edge 19 generally parallel to the adjacent edge of the partial divider 12 and a lower outer edge 20 conforming to the shape of the mold side wall 9 which slopes outwardly and is of a generally concave configuration in order that the ice pieces 4 and fingers 16 can pivot about the axis of the shaft 18 from their normal position within the mold illustrated in FIG. 3 to the discharge or harvesting position illustrated in FIG. 4. As each of the fingers 16 as shown in FIG. 3 of the drawing extends below the normal water level in the mold, the lower end portions of the fingers are frozen into engagement with the adjacent interconnected ice pieces formed in the adjacent compartments on each side of a partial divider 12. To assure anchoring of the fingers to these ice pieces, the upper edge portion 21 of each finger preferably includes a slot or groove 22 having its lower edge portion below the normal water level in the mold, and in effect giving the submerged or lower end portion of the finger 16 a hook shape which more securely anchors the fingers 16 in engagement with the ice pieces. Also as water is normally introduced into an ice mold of this type at only one point, the upper outer edge portions 21 of the fingers 16 are preferably spaced from the adjacent mold side wall 9 while the fixed partitions 10 are provided with slots 24 in order to provide for the free and relatively unrestricted flow of water from one section or compartment to another during filling of the mold.

In order to release ice pieces formed in the compartments 11 from the mold walls and the partitions integral therewith, there is provided an electric heating element 27 extending in the form of a loop around the bottom wall 14 below the side walls 8 and 9. When this heating element is energized, the mold walls and the partitions become sufficiently warm to melt the bond between the mold surfaces and the ice pieces. However, since the movable fingers 16 are spaced from the mold walls and from the partitions and are also cooled by the cold air circulating through the freezer compartment 2 and contacting the unsubmerged upper ends thereof, there is insufficient warming of these fingers to melt the ice bond thereto. Since each finger 16 depends into the space between the adjacent compartments 11 in each mold section, the ice pieces on opposite sides of each finger remain frozen into engagement therewith so that upon rotation of the shaft 18 these ice pieces adhering along their front or outer end portions to the finger 16 are carried upwardly and outwardly from the mold to a discharge position as shown in FIGS. 4 and 5 of the drawing. After the ice pieces have passed over the side wall 8 of the mold, they come into engagement with bumpers 25. In accordance with the preferred embodiments of present invention, these bumpers are arranged between adjacent ice forming compartments and in line with the partial dividers 12 and fingers and are provided with tapered ice contacting end portions 26 for engaging and removing the ice pieces from the fingers 16. To this end the tapered end portions 26 of the bumpers are designed to pass into the slots 28 or spaces formed by the partial dividers 12 between the adjacent ice pieces so that the tapered ends apply a wedging action to the adjacent pieces which strips them from the fingers 16 as the fingers move the ice pieces downwardly over the bumpers.

By the above-described arrangement of the partial dividers 12 and the fingers 16 in which the partial dividers extend a major portion of the distance across the mold, the partial dividers provide a substantial water contacting area for removal of heat from the water introduced into the mold. To this end the dividers 12 are preferably as wide as possible, their maximum width being limited by the size of the fingers 16 required to provide the adhesion thereof to the ice pieces necessary for transfer of the the ice pieces out of the mold.

In addition, the partial dividers 12 provide means for forming adjacent ice pieces which are separated except where they are in contact with the fingers 16 thus facilitating the mechanical separation of the pieces from the fingers and from one another during the harvesting operation. Furthermore, as the ice pieces are frozen into engagement with one another and with their transfer finger adjacent the outer ends thereof, the bumpers 25 can be arranged so that they contact the ice pieces in the direction of their inner ends, that is, nearer their ends adjacent shaft 18 than to the ends contacting the fingers both to obtain maximum leverage for freeing the adjacent ice pieces from the fingers 16 and from one another and to assure that the total forces applied to the pieces will be such that the freed pieces will be directed outwardly away from the mold.

Control and power mechanism for the automatic operation of the ice maker is generally housed in a housing 30 secured to one end of the mold 5. The power mechanism includes a motor 31 diagrammatically illustrated in FIG. 7 of the drawing and a suitable speed reducing gear train (not shown) forming a drive mechanism directly connected to a drive shaft 32 carrying a drive arm 33. The shaft 18, which is supported at one end by a bearing 34 and adjacent the other end by a bearing 35 in the front wall 36 of the housing 30, has an end portion extending into the housing and a pawl and cam assembly 38, shown in FIG. 6 of the drawing, is connected to the housing end of this shaft. This assembly and the arm 33 mounted on the drive shaft 32 provides means for connecting the drive shaft 32 to the shaft 18 for rotation of shaft 18 upon operation of the motor 31. Upon rotation of the drive shaft 32, contact of the drive arm 33 with the pawl 39 effects rotation of the shaft 18 so that the fingers 16 rotate upwardly and out of the mold to the ice discharge position. When the fingers 16 reach this position, a projection 43 on the wall 36 of the housing is arranged to contact the pawl 39 and disengage the pawl from the drive arm 33. This allows the motor and drive mechanism to continue to rotate in the same direction while a return spring 44 causes the shaft 18 to rotate in the opposite direction and return the fingers 16 to their normal position in the mold.

Additional elements required for a completely automatic operation of the ice maker through successive charging, freezing, and ice harvesting cycles includes means for automatically introducing a charge of water into the mold, means for energizing the motor in order to initiate an ice harvesting cycle and means for stopping the ice making operation whenever the receptacle 3 is full of ice.

The illustrated water supply means, which is more fully described and claimed in my copending application S.N. 25,432 filed concurrently herewith and assigned to the same assignee as the present invention, includes a filler tube 45 connected through a normally closed solenoid valve 46 to a suitable source of water supply. When the solenoid valve 46 is energized to open the valve, water supplied to the mold from the outlet end of the tube 45, this charge of water flowing downwardly into the mold over a baffle 47 supported on the mold side wall 9. The water thus introduced into the mold flows from compartment-to-compartment through the slots 24 and around the fingers 16.

In order to initiate the ice harvesting cycle as soon as the water introduced into the mold has frozen, there is provided a motor control circuit including thermal actuated switch such as a bellows operated single pole double throw switch 49 diagrammatically illustrated in FIG. 7 and generally housed within the housing 30. The sensing bulb component 50 of the switch, in the form of a capillary tube extends through the housing wall 36 and into contact with the outer surface of the mold wall 6 so that the switch 49 operates in response to the temperature of the mold.

After a number of ice making cycles, the receptacle 3 becomes filled with ice pieces. In order to stop the ice making operation when this occurs, the control circuitry includes a normally closed switch 51 actuated by a U-shaped feeler arm 52 which is pivotally mounted at each end along the side 9 of the ice mold in such a position that it normally, hangs downwardly into the receptacle 3. In order that the feeler arm will measure the amount of ice stored in the receptacle 3, means are provided whereby it is raised out of the receptacle during each ice making cycle so that when it returns to its normal position within the receptacle, it will rest on top of the newly added ice if that ice has resulted in a substantial filling of the receptacle. To obtain this control, the feeler arm includes, within the housing 30, an extension or actuating arm 54 which rides on a cam surface 55 provided on the cam and pawl assembly 38. Upon rotation of the shaft 18, this cam surface raises the feeler arm 52 out of the receptacle at the same time that the fingers 16 are being pivotally moved upwardly and out of the mold. Switch 51 which, as is shown in FIG. 6 of the drawing, is normally held in a closed position by the actuating arm 54 thereupon opens and remains open so long as the feeler arm 52 is held in a raised position either by the accumulation of ice in the receptacle 3 or by the operation of the cam surface 55.

Additional control circuitry required for the automatic control of an ice maker through a complete production cycle will be described during the following consideration of the ice maker operation.

During freezing of a charge of water in the mold 5, the temperature of the mold end wall 6 gradually decreases. When the temperature of this wall as sensed by the sensing bulb 50 indicates the complete freezing of the water in the mold, the switch arm 58 of the single pole double throw switch 49 moves into contact with the cold switch contact 59. This completes a motor energizing circuit and a heater energizing circuit between the supply conductors 60 and 61 through the normally closed feeler arm switch 51, contact 59 of switch 49 and a normally closed motor switch 62 constituting one of a plurality of switches operated by a motor driven cam 63. A few degrees of rotation of the drive shaft 32 is permitted before the driven arm 33 carried by this shaft engages the pawl 39 and the cam 63 driven by the same drive shaft 32 is so designed that before the arm 33 engages this pawl 39, the cam will close a normally open cam operated switch 64 in a motor energizing circuit bypassing the feeler arm switch 51 and switch 49 and will open the switch 62 in the first motor energizing circuit so that no load is placed on the motor until the ice pieces are melted free of the mold.

The motor 31 remains de-energized upon the opening of the switch 62 while the heater remains energized through the initial heater energizing circuit including the contact 59 of switch 49 and also through a circuit including switch 64 until the sensing element 50 of the switch 49 senses a predetermined mold wall temperature sufficiently high to assure a thawing of the bond between the ice pieces and the mold surfaces. Switch arm 58 then moves into contact with the warm contact 66 whereupon the motor 31 is again energized through a circuit including the switch 64 and contact 66 of switch 49. Rotation of drive shaft 32 thereupon causes the drive shaft 18 to rotate and pivot the fingers 16 upwardly and outwadrly from the mold so that the ice pieces carried by the fingers are brought into engagement with the bumpers 25 to release the ice pieces from the fingers 16 for discharge into receptacle 3. At this point stop 43 trips the pawl 39 so that the power mechanism including the drive shaft 32 is disengaged from the shaft 18, spring 44 then returns the fingers 16 to the mold. Continued rotation of the cam 63 closes a switch 67 to energize and open the solenoid valve 46, the portion of the cam surface indicated by the numeral 68 being designed to time the open period for the valve 46 to introduce a controlled quantity of water into the mold.

As the cam 63 rotates through one revolution and returns to its original or starting position, switches 62, 64 and 67 are reset to their normal or starting positions, the motor 31 being de-energized by the opening of switch 64. The control and power mechanism is thereby set for the next operating cycle of the ice maker, which is initiated upon the decrease in the temperature of the mold side wall 6 to a point at which the arm 58 of the thermal switch 49 again engages contact 59 unless the amount of ice collected in the receptacle 3 is sufficient to maintain the feeler arm 52 in an elevated position. In such case, switch 51 will remain open and so that the motor cannot be energized by the switch 49 until sufficient ice has been removed from the receptacle 3 to permit the feeler arm to drop to its normal position.

While there has been shown and described a particular embodiment of the present invention, it will be obvious to those skilled in the art that various changes and modifications may be made therein without departing from the invention, and it is intended by the appended claims to cover all such changes and modifications that fall within the true spirit and scope of the invention.

What I claim as new and desire to secure by Letters Patent of the United States is:

1. An ice maker comprising a mold having side and end walls, means including a transverse divider extending from one mold side wall part way to the other mold side wall to form adjacent compartments in said mold in which water is frozen into ice pieces, heating means for warming said mold and said transverse divider to free the ice pieces therefrom, a metal finger extending into said mold between said divider and said other side wall below the level of water in said compartments whereby said finger is frozen into engagement with the ice pieces formed in said compartments, said finger substantially bridging the space between said divider and said other mold side wall but being spaced therefrom, said finger being mounted for pivotal movement thereof along with said ice pieces adhering thereto about an axis adjacent said one side wall to said mold and upwardly and outwardly over said one side wall to an inverted position alongside of said mold, and a bumper arranged along said one side wall of said mold for engaging said ice pieces at points between said finger and said one side wall of said mold and freeing said pieces from said finger during movement thereof to said inverted position.

2. An ice maker comprising a mold having side and end walls, means including a transverse divider extending from one mold side wall part way to said other side wall to form in said mold adjacent compartments in which water is frozen into ice pieces, said compartments being interconnected by the space between said divider and said other side wall, heating means for warming said mold and said transverse divider to free the ice pieces therefrom, a metal finger extending into said space between said divider and said other side wall below the level of water in said compartments whereby said finger is frozen into engagement with the ice pieces formed in said adjacent compartments, said finger being of substantially the same thickness as said transverse divider and substantially bridging the space between said divider and said other mold side wall but being spaced therefrom, means for pivotally mounting said finger along with the adjacent ice pieces adhering thereto about an axis adjacent said one side wall of said mold and upwardly and outwardly over said one side wall to an inverted position alongside of said mold and a bumper arranged along said one side wall of said mold and in line with said divider for engaging the adjacent ice pieces during movement of said ice pieces to said inverted position, said bumper having a tapered end portion adapted to enter the space formed between said ice pieces by said divider to engage the opposed side edges of said ice pieces and by wedging action break said ice pieces free from said finger.

3. An ice maker comprising an elongated mold having side and end walls, means including alternate full width and partial width transverse dividers dividing said mold into a plurality of compartments in which water is frozen into ice pieces, heating means for warming said mold and said transverse dividers to free the ice pieces therefrom, said partial width dividers terminating short of one side wall of said mold to form spaces between said dividers and said one side wall, a finger extending into each of said spaces in spaced relation with said dividers and one side wall and below the level of water in said mold, each of said fingers substantially bridging the space between the adjacent partial width dividers and said one side wall, said fingers being mounted for pivotal movement thereof along with the adjacent ice pieces adhering thereto about an axis adjacent the other side wall of said mold and upwardly and outwardly over said other side wall to an inverted position alongside of said mold, and tapered bumpers arranged along said other side wall of said mold and in line with said partial width dividers for engaging opposed side edges of said ice pieces during movement thereof to said inverted position to free said pieces from said fingers.

4. An ice maker comprising an elongated mold having side and end walls, means including alternate full width and partial width transverse dividers dividing said mold into a plurality of compartments in which water is frozen into ice pieces, heating means for warming said mold and said transverse dividers to free the ice pieces therefrom, said partial width dividers having one end thereof spaced from one side wall of said mold, a finger extending into each of the spaces between said partial width dividers and said one side wall out of contact therewith and below the level of water in said mold, each of said fingers substantially filling the space between the adjacent partial width divider and said one side wall, said fingers being mounted for pivotal movement thereof along with the adjacent ice pieces adhering thereto about an axis adjacent the other side wall of said mold and upwardly and outwardly over said other side wall to an inverted position alongside of said mold, and tapered bumpers arranged along said other side wall of said mold in line with the slots between said adjacent ice pieces formed by said partial width dividers for entering said slots and engaging said ice pieces during movement thereof to said inverted position to free said pieces from said fingers.

References Cited in the file of this patent
UNITED STATES PATENTS

| | | |
|---|---|---|
| 2,161,321 | Smith | June 6, 1939 |
| 2,717,501 | Andersson | Sept. 13, 1955 |
| 2,718,125 | Horvay | Sept. 20, 1955 |
| 2,757,520 | Sampson | Aug. 7, 1956 |